United States Patent
Reddy

(10) Patent No.: US 10,866,788 B2
(45) Date of Patent: Dec. 15, 2020

(54) SYSTEM AND METHOD FOR AUTOMATED GENERATION OF INTEGRATION ELEMENTS MODELING PROCESS FLOW FOR AN INTEGRATION PROCESS WITH A SWAGGER API

(71) Applicant: Dell Products, LP, Round Rock, TX (US)

(72) Inventor: Varun Reddy, Pottstown, PA (US)

(73) Assignee: BOOMI, INC., Round Rock, TX (US)

(*) Notice: Subject to any disclaimer, the term of this patent is extended or adjusted under 35 U.S.C. 154(b) by 0 days.

(21) Appl. No.: 15/967,319

(22) Filed: Apr. 30, 2018

(65) Prior Publication Data

US 2019/0332357 A1  Oct. 31, 2019

(51) Int. Cl.
*G06F 8/34* (2018.01)
*G06F 8/41* (2018.01)
*G06F 9/54* (2006.01)
*G06F 9/448* (2018.01)

(52) U.S. Cl.
CPC .......... *G06F 8/34* (2013.01); *G06F 8/427* (2013.01); *G06F 9/4488* (2018.02); *G06F 9/54* (2013.01)

(58) Field of Classification Search
CPC ..... G06F 8/34; G06F 8/20; G06F 8/36; G06F 8/427; G06F 9/54; G06F 9/4488
See application file for complete search history.

(56) References Cited

U.S. PATENT DOCUMENTS 9,936,005 B1 4/2018 Palladino
9,959,198 B1* 5/2018 Jha ...................... G06F 11/3664
2011/0153590 A1 6/2011 Chang
2011/0209162 A1* 8/2011 Machiraju ............... G06F 8/20
719/328
2016/0378439 A1* 12/2016 Straub ...................... G06F 8/34
717/107

(Continued)

OTHER PUBLICATIONS

Barbaglia et al; Definition of REST web services with JSON schema;Oct. 24, 2016;15 pages; (Year: 2016).*

(Continued)

*Primary Examiner* — Wei Y Zhen
*Assistant Examiner* — Brahim Bourzik
(74) *Attorney, Agent, or Firm* — Prol Intellectual Property Law, PLLC; H. Kenneth Prol

(57) ABSTRACT

An information handling system a processor receiving an open-standard format file describing code instructions of a Swagger custom API, the processor parsing the file to identify a first Swagger parameter object whose location is defined by a first Swagger path object, a memory for storing a first Swagger operation object and for storing a customized software integration application enabling electronic data exchange comprising a plurality of connector code sets, each of the connector code sets being associated with an integration modeling element selected to generate a customized integration flow model of the specific integration process, wherein the integration modeling element selected is a custom connector integration element associated with a custom connector code sets including the first Swagger operation object acting on the first Swagger parameter object, and the processor transmitting an executable runtime engine and the custom connector code set for execution at an execution location.

20 Claims, 8 Drawing Sheets

(56) References Cited

U.S. PATENT DOCUMENTS

| | | | |
|---|---|---|---|
| 2017/0078360 A1* | 3/2017 | Kumar | G06F 16/00 |
| 2017/0102925 A1* | 4/2017 | Ali | G06F 8/36 |
| 2017/0315789 A1* | 11/2017 | Lam | G06F 3/04847 |
| 2017/0316363 A1* | 11/2017 | Siciliano | G06F 3/0482 |
| 2018/0196643 A1 | 7/2018 | Dolby | |

OTHER PUBLICATIONS

Apache Licence;"Swagger RESTful API Documentation Specification";"25 pages" (Year: 2014).*

"Sohan et al";"Automated Example Oriented REST API Documentation at Cisco";"10 pages" (Year: 2017).*

Barbaglia et al;"Definition of REST web services with JSON schema"; 15 pages (Year: 2016).*

Liu et al;Hierarchical RNN Networks for Structured Semantic Web API Model Learning and Extraction; 6 pages (Year: 2017).*

M. Ralphson—GitHub, "OpenAPI Specification 2.0.md at master," Apr. 4, 2017, 42 pages.

* cited by examiner

SYSTEM AND METHOD FOR AUTOMATED GENERATION OF INTEGRATION ELEMENTS MODELING PROCESS FLOW FOR AN INTEGRATION PROCESS WITH A SWAGGER API

FIELD OF THE DISCLOSURE

The present disclosure relates generally to a system and method for deploying and executing customized data integration processes. More specifically, the present disclosure relates to automated generation of custom connector visual elements modeling integration processes involving application platform interfaces (APIs) conforming to the Swagger open source specification.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
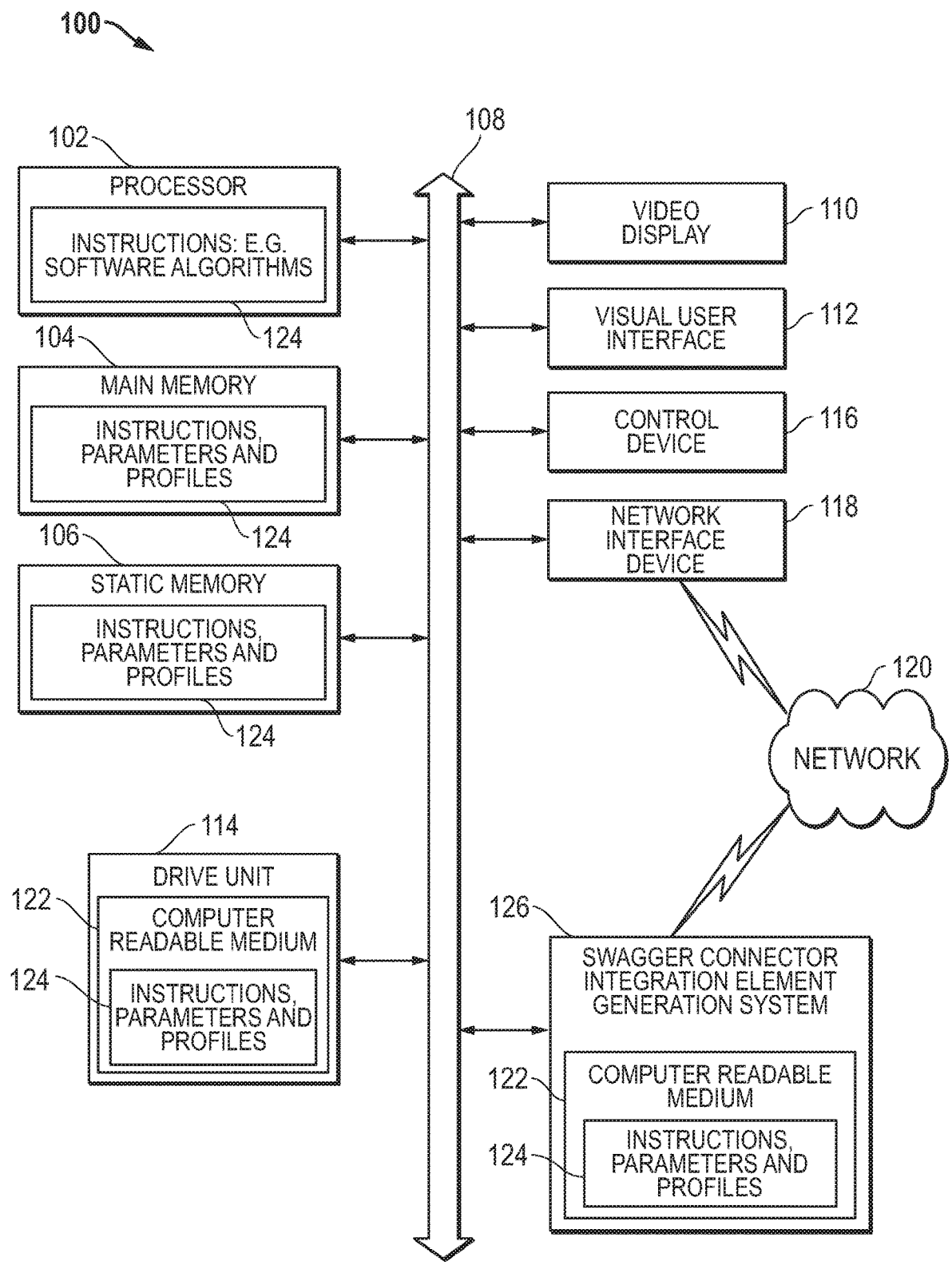
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, such as a CD-ROM, or distribution via download of the application from the worldwide web to an end user. Upon receipt of the computer-readable medium or downloaded application, the end user executes installation files stored on the CD-ROM to install the executable software application on the user's personal computer (PC), etc. When the software is initially executed on the user's PC, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may take the form of application platform interfaces (APIs).

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc. physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart, and how that data should be communicated with Walmart. A supplier/enterprise is then responsible for finding a generic, commercially available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model a business integration process via a flowcharting process, using only a web browser interface. During such a modeling process, the user would select from a predetermined set of process-representing visual elements that are stored on a remote server, such as the web server. By way of an example, the integration process could enable a bi-directional exchange of data between internal applications of an enterprise, between internal enterprise applications and external trading partners, or between internal enterprise applications and applications running external to the enterprise.

A customized data integration software application creation system in an embodiment may allow a user to create a customized data integration software application by modeling a data integration process flow using a visual user interface. A modeled data integration process flow in embodiments of the present disclosure may model actions taken on data elements pursuant to executable code instructions without displaying the code instructions themselves. In such a way, the visual user interface may allow a user to understand the high-level summary of what executable code instructions achieve, without having to read or understand the code instructions themselves. Similarly, by allowing a user to insert visual elements representing portions of an integration process into the modeled data integration process flow displayed on the visual user interface, embodiments of the present disclosure allow a user to identify what she wants executable code instructions to achieve without having to write such executable code instructions.

Once a user has chosen what she wants an executable code instruction to achieve in embodiments herein, the code instructions capable of achieving such a task may be generated. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, machine-executable file formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard format.

In addition to the advent of open-standard, human-readable, machine-executable code instructions, the advent of application platform interfaces (APIs) designed using such open-standard code instructions have also streamlined the methods of communication between various software components. In embodiments herein, the open-standard code instructions for a specific API involved in a business integration process may be accessed and analyzed or parsed in order to understand the ways in which systems outside the API may access data controlled by the API. An API may provide specifications for the ways in which routines, data structures, object classes, variables, or remote calls may be invoked and/or handled during business integration processes. By clearly defining the ways in which data may be transferred or altered during a business integration process involving an API, the use of such an API makes the parsing of code instructions more simple.

For example, if the API defines a specific syntax for the "get" operation, the code instructions for that API may be easily parsed by searching for that specific syntax, and associating the portions of the code instructions where that specific syntax is found with the "get" operation. In such a way, the API code instructions may parsed to identify subsets of code instructions used to locate data, subsets of code used to invoke actions taken on data, and subsets of code instructions identifying specific data sets stored at the identified location, and/or the parameters of those data sets. Once a subset of code instructions and its purpose has been identified, the subset of code instructions may be stored in a memory, and associated within that memory with an identification of its purpose. For example, a specific subset of code instructions operating to invoke the "get" action may be stored in a memory, along with an association between the stored subset of code instructions and an identification of the "get" action.

Full code instructions of an API in embodiments described herein may include several different examples of each of these. For example, parsing the full code instructions may indicate data may be stored at several different locations accessible by the API, several different types of actions may be performed on the data, and several different data sets with several different parameters may be stored at those many locations. Parsing the code may thus result in identification of a list of possible data repository locations accessible by the API, which may be referred to herein as object types. Parsing the code may also result in identification of a list of possible actions that may be taken on these object types, as well as a list of possible data set identifications, referred to herein as data elements. Once each of these subsets of code instructions and their purposes have been identified, each subset of code instructions may be stored in a memory, and associated within that memory with an identification of its purpose, as described directly above.

Such lists in embodiments of the present disclosure may instruct the ways data may be accessed via the API, and manipulated during a business integration process. In other words, a business integration process, or a portion thereof involving accessing that API may be modeled simply by choosing a data object, an action, and a data element from each of these respective lists. In embodiments herein, a user interface may be generated for allowing a user to choose from a list of available data objects, a list of available actions, and a list of available data elements in order to model the behavior of a custom connector element within a visual flow diagram of a business integration process. A user may add a connector element to a visual flow diagram, indicating she wishes to access and/or manipulate data via an API, which may prompt display of a connector import wizard user interface. The connector import wizard user interface in embodiments described herein may then prompt the user to choose an object type from the list of available object types identified through the parsing of that API's code instructions. Similarly, the connector import wizard user interface may prompt the user to select an available action, and an available data element. In doing so, the user may define a business integration process involving accessing the chosen data object (e.g. data location), and performing the chosen action on the chosen data element stored at the chosen data location. In order to execute such a business integration process, the subsets of code instructions associated with each of the chosen data object, action, and data element may be automatically located within memory, and combined to form a custom connector code set for execution by a run-time engine. In such a way, the user may design the business integration process involving accessing data via the API by choosing from a list of available data objects, actions, and data elements within the connector import wizard user interface, without having to write, read, or access any code instructions.

The connector wizard user interface in embodiments described herein may be generated following the parsing of the API code instructions\. Such parsing may have previously required dedication of a large amount of time and manpower resources. Because APIs may have several different types of syntaxes and structures, parsing the code instructions of each API may involve learning those syntaxes and structures. Even if each API adheres to one of the open-standard, human-readable, machine-executable file formats (e.g. XML, JSON), these file formats may not define the universe of available object types, actions, and/or data elements that may be incorporated into an API's code instructions. However, an API-specific open-standard specification called Swagger addresses these issues. The Swagger standard defines a specific syntax for identifying data locations, a list of available actions that can be taken on data, and a syntax for identifying specific data sets or data elements. As such, code instructions written in accordance with the Swagger specification become much easier to parse, because an automatic search for such syntaxes or available actions may be performed to identify, store, and associate subsets of code instructions with specific data locations, actions, and data elements. In such a way, embodiments of the present disclosure may automatically parse Swagger-compliant API code instructions, and automatically generate a connector import wizard for such Swagger-compliant API, avoiding the dedication of essential resources to a previously time-consuming task.

When a user chooses an object type, action, and/or data element within the connector import wizard in embodiments herein, a visual connector element representing the user-specified communication with the Swagger-compliant API may be inserted into a larger visual integration process flow diagram. Other visual components may then be added to the visual connector component in order to model a full integration process. In some embodiments, the visual connector component by itself may form the full integration process.

The integration process modeled by the combination of all user-chosen visual process components may then be used to generate a customized data integration software.

A customized data integration software in an embodiment may include a run-time engine for execution of a connector code set comprising data required for electronic communication in accordance with a specific application programming interface (API). The dynamic runtime engine, when initiated, in an embodiment, may download the connector code set associated with it, and execute that code instruction to perform the integration process modeled by the custom connector integration element in the visual flowchart generated by the user.

Examples are set forth below with respect to particular aspects of an information handling system for generating custom connector visual elements for interfacing with a Swagger compliant API.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the Swagger connector integration element generation system 126 that may operate on servers or systems, remote data centers, or on-box in individual client information handling systems such as a local display device, or a remote display device, according to various embodiments herein. In some embodiments, it is understood any or all portions of code 124 for the Swagger connector integration element generation system 126 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the Swagger connector integration element generation system 126 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the Swagger connector integration element generation system 126. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface 112 are stored in a memory of the Swagger connector integration element generation system 126.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), or an API adhering to the Swagger open source specification may enable application programs 124 to interact or integrate operations with one another.

In an example of the present disclosure, instructions 124 may execute software for generating a visual connector element for an integration process involving data transfer or manipulation between an enterprise system/network and an API conforming to the Swagger open source specification, and an API may enable interaction between the application program and device drivers and other aspects of the information handling system and software instructions 124 thereon. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the Swagger connector integration element generation system 126 may include a computer-readable medium 122 such as a magnetic disk, or a solid-state disk in an example embodiment. The computer-readable medium of the memory, storage devices and the Swagger connector integration element generation system 104, 106, 114, and 126 may store one or more sets of instructions 124, such as software code corresponding to the present disclosure.

The disk drive unit 114, static memory 106, and computer readable medium 122 of the Swagger connector integration element generation system 126 also contain space for data storage such as an information handling system for managing locations of executions of customized integration processes in endpoint storage locations. Connector code sets, and trading partner code sets may also be stored in part in the disk drive unit 114, static memory 106, or computer readable medium 122 of the Swagger connector integration element generation system 126 in an embodiment. In other embodiments, data profile code sets, and run-time engines may also be stored in part or in full in the disk drive unit 114, static memory 106, or computer readable medium 122 of the Swagger connector integration element generation system 126. Further, the instructions 124 of the Swagger connector integration element generation system 126 may embody one or more of the methods or logic as described herein.

In a particular embodiment, the instructions, parameters, and profiles 124, and the Swagger connector integration element generation system 126 may reside completely, or at least partially, within the main memory 104, the static memory 106, disk drive 114, and/or within the processor 102 during execution by the information handling system 100. Software applications may be stored in static memory 106, disk drive 114, and the Swagger connector integration element generation system 126.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof.

The Swagger connector integration element generation system 126 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the Swagger connector integration element generation system 126. The Swagger connector integration element generation system 126 may be operably connected to the bus 108. The Swagger connector integration element generation system 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the Swagger connector integration element generation system 126 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
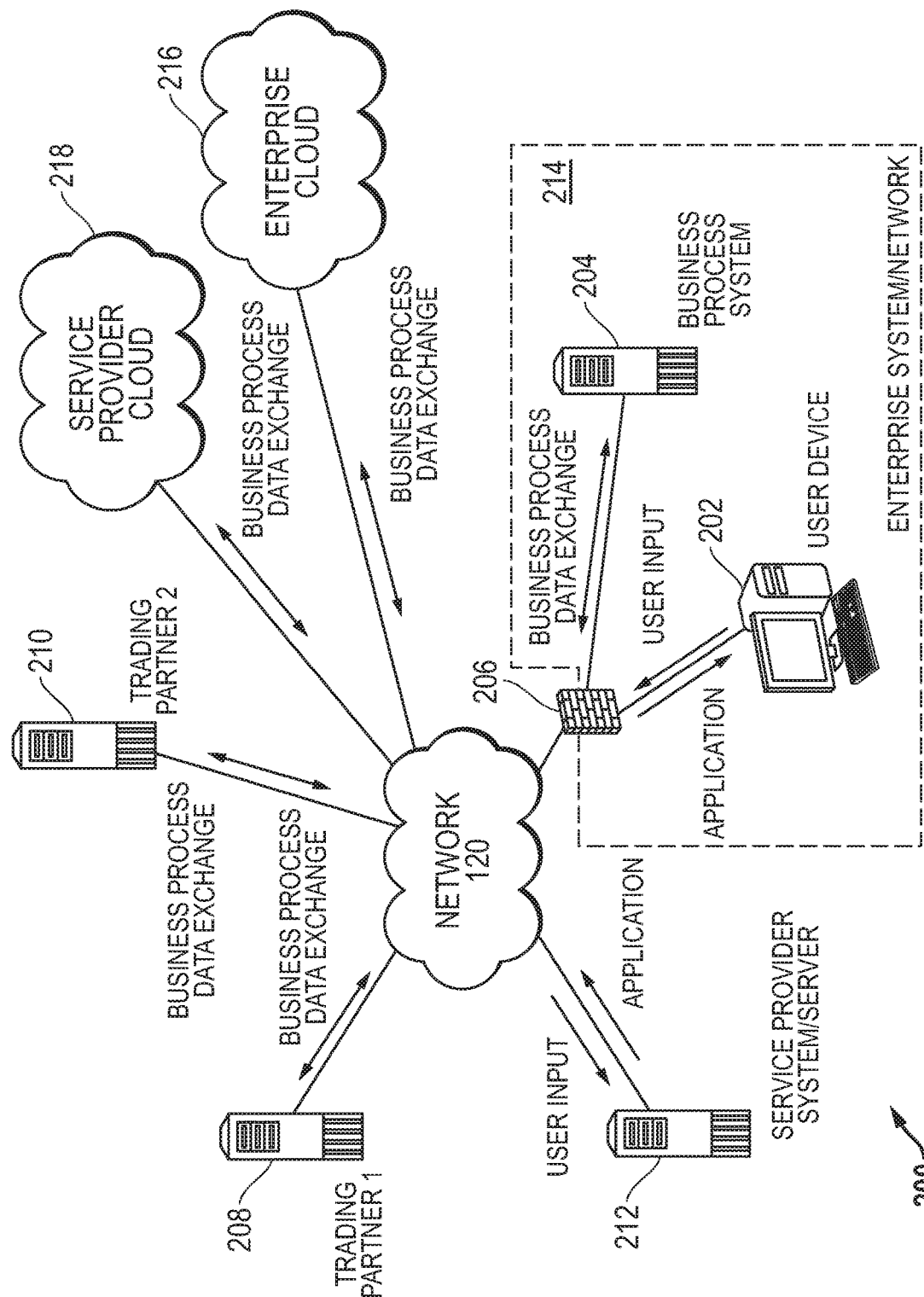
FIG. 2 is a block diagram illustrating a simplified integration network according to an embodiment of the present disclosure.

FIG. 2 is a block diagram illustrating a simplified integration network 200 including a service provider system/server 212 and an enterprise system/network 214 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, Oracle's OneWorld JD Edward ERP, Infor's WMS Application, or many other types of databases.

In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via FTP or SFTP.

As yet another example embodiment, trading partner system 208 may allow for access and manipulation of data according to an application interface platform (API) adhering to the Swagger open source specification. The Swagger standard defines a specific syntax for identifying data locations, a list of available actions that can be taken on data, and a syntax for identifying specific data sets or data elements. This preset definition of syntaxes allows for easy identification of subsets of code instructions with specific data locations, actions, and data elements. As such, code instructions written in accordance with the Swagger specification become much easier to parse.

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user to model an integration process including one or more sub-processes for data integration through a business process data exchange between an enterprise system/network 214 and outside entities. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216.

The user of an integration process-modeling user interface in an embodiment may model one or more business process data exchanges via network 120 within an integration process by adding one or more connector integration elements to an integration process flow diagram. These connector integration elements in an embodiment may model the ways in which a user wishes data to be accessed, moved, and/or manipulated during the one or more business process data exchanges. Each connector element the user adds to the integration process flow diagram in an embodiment may be associated with a pre-defined subset of code instructions stored at the service provider systems/server 212 in an embodiment. Upon the user modeling the integration process, the service provide system/server 212 in an embodiment may generate a run-time engine capable of executing the pre-defined subsets of code instructions represented by the connector integration elements chosen by the user. The runtime engine may then execute the subsets of code instructions in the order defined by the modeled flow of the connector integration elements given in the integration process flow diagram. In such a way, an integration process may be executed without the user having to access, read, or write the code instructions of such an integration process.

Figure 3:
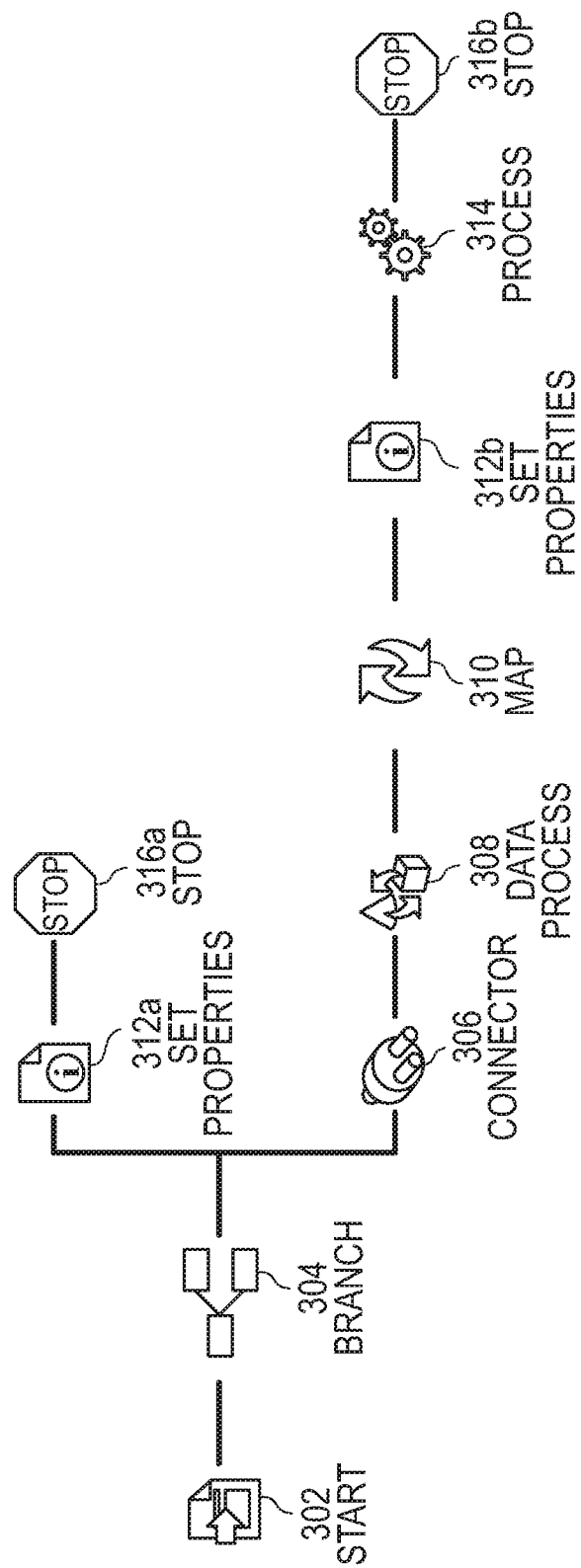
FIG. 3 is a block diagram illustrating a user-generated flow diagram of an integration process according to an embodiment of the present disclosure.

FIG. 3 is a block diagram illustrating a user-generated flow diagram of an integration process for exchange of electronic data records according to an embodiment of the present disclosure. A user may generate a flow diagram in an embodiment by providing a chronology of process-representing integration elements via the use of an integration process-modeling user interface. In some embodiments, the integration process-modeling user interface may take the form of a visual user interface. In such embodiments, the user-selectable elements representing integration sub-processes (e.g. connector integration elements) may be visual icons.

An integration process-modeling user interface in an embodiment may provide a design environment permitting a user to define process flows between applications/systems, such as between trading partner and enterprise systems, and between on-site data centers and cloud-based storage modules, and to model a customized business integration process. Such an integration process-modeling user interface in an embodiment may provide a menu of pre-defined user-selectable elements representing integration sub-processes and permit the user to arrange them as appropriate to model a full integration process. For example, in an embodiment in which the integration process-modeling user interface is a visual user interface, the elements may include visual, drag-and-drop icons representing specific units of work (known as process components) required as part of the integration process. Such a process component in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration sub-process icons or elements may be identifiable by a process component type, and may further include an action to be taken. For example, a process component may be identified as a "connector" component. Each "connector" component, when chosen and added to the process flow in the integration process-modeling user interface, may allow a user to choose from different actions the "connector" component may be capable of taking on the data as it enters that process step. Further the integration-process modeling user interface in an embodiment may allow the user to choose the data set or data element upon which the action will be taken. The action and data element may be selected by the user via a separate user interface called a connector import wizard in some embodiments, as described herein. The action and data element the user chooses may be associated with a connector code set, which may be pre-defined and stored at a system provider's memory in an embodiment. The system provider server/system in an embodiment may generate a dynamic runtime engine for executing these pre-defined subsets of code instructions correlated to each individual process-representing visual element (process component) in a given flow diagram in the order in which they are modeled in the given flow diagram.

As shown in FIG. 3, such process-representing visual elements may include a start element 302, a connector element 306, and stop elements 316a and 316b. Other embodiments may also include a branch element 304, a data process element 308, a process call element 314, set properties elements 312a and 312b, and a map element 310. A connector element 306, and a start element 302 in an embodiment may represent a sub-process of an integration process describing the accessing and/or manipulation of data via an API. Once a user has chosen to add a connector element 306 in an embodiment, the integration process-modeling user interface may prompt the user for further information used in customizing the connector element. For example, the integration process-modeling user interface may prompt the user to provide such information via a separate connector import wizard user interface in an embodiment, as described herein. Once the user provides the customizing information, the integration process-modeling user interface may identify one or more subsets of code instructions stored in memory and associated with the received, user-specified customizing information. The service provider server/system may generate one or more dynamic runtime engines, which are executable software applications capable of executing the subsets of code information stored in memory and associated with the user-specified customizing information received via the connector import wizard user interface.

In an embodiment, a start element 302 may operate to begin a process flow, and a stop element 316a and stop element 316b may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. The start element 302 in an embodiment may also operate as a connector element. The user may identify the source of incoming data to be integrated in some embodiments via a connector import wizard user interface, as described herein.

In an embodiment, a connector element 306 may operate to enable communication with various applications or data sources between which the user wishes to exchange data. The connector element 306 in an embodiment may further allow or require the user to provide data attributes unique to the user's specific integration process. For example, by adding a connector element 306 to an integration process, the integration process-modeling user interface in an embodiment may prompt the user to identify the action she wishes to take, and the data element upon which she wishes that action to act. The user may provide such information, for example, via a connector import wizard user interface in some embodiments, as described herein. For example, in an embodiment, the source of the data identified in start element 302 may be an API compliant with the Swagger open source specification, and the operation the user wishes to perform on the data incoming from the source may include the Swagger operation objects get, post, delete, put, patch, head, or options.

Figure 4A:
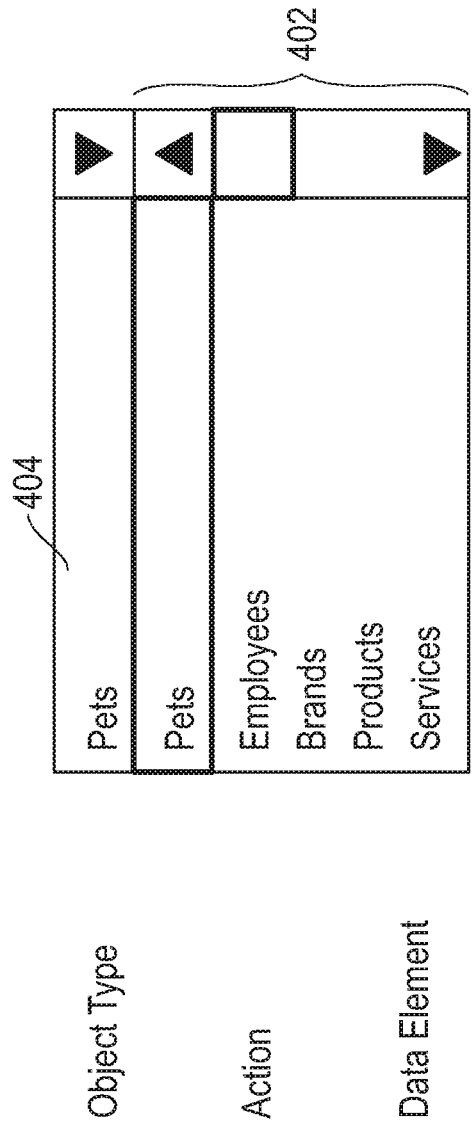
FIG. 4A is a block diagram illustrating a connector import wizard user interface according to an embodiment of the present disclosure.

FIG. 4A is a block diagram illustrating a connector import wizard user interface identifying a user-selected object type according to a first embodiment of the present disclosure. As described herein, a connector import wizard 400 in an embodiment may allow a user to define an action she wishes to take, the data element upon which she wishes the action to act, and the type of object the data element is. This combination of object type, action, and data element in an embodiment may define the way in which data will be integrated, accessed, or manipulated via an API as represented in a visual flow diagram of an integration process by a connector element.

The executable code instructions of the API may dictate the ways in which the integration process modeled by the visual flow diagram may access and or manipulate data controlled by the API. For example, an API may provide specifications for the ways in which routines, data structures, object classes, variables, or remote calls may be invoked and/or handled during business integration processes. Such code instructions may be generated in an open-source, human-readable, machine-executable formatted file. For example, API code instructions may be generated within a JSON file in an embodiment. In other embodiments, API code instructions may be generated within an XML, file, or other current or future-developed type of open-source, human-readable, machine-executable file format.

The connector import wizard 400 in an embodiment may operate to present each of the available ways in which the data controlled by the API may be accessed and/or manipulated. The user could then use the wizard 400 to choose a method of accessing and/or manipulating the data that is in compliance with the API specifications. In other words, the options presented in the drop down menu 402 for available object types in an embodiment may be dictated by the identification of object types employed in the code instructions of the API. In other embodiments, other interface methods of allowing the user to select from available object types, actions, or data elements may be used. For example, other embodiments may employ a search capability, or an expandable outline tree with hyperlinks, rather than a drop-down menu format.

In order to generate such a drop down menu 402, the Swagger connector integration element generation system may access and parse the code instructions of the API to identify all mentions of object types. Because APIs may have several different types of syntaxes and structures, parsing the code instructions of each API may involve learning those syntaxes and structures. Even if each API adheres to one of the open-standard, human-readable, machine-executable file formats (e.g. WL, JSON), these file formats may not define the universe of available object types, actions, and/or data elements that may be incorporated into an API's code instructions.

However, an API-specific open-standard specification called Swagger addresses these issues. The Swagger standard defines a specific syntax for identifying data locations, a list of available actions that can be taken on data, and a syntax for identifying specific data sets or data elements. For example, Swagger API code instructions in an embodiment may parsed to identify subsets of code instructions used to identify object types that data elements may take. In some embodiments, the "object type" of a data element may be defined by the location at which it is stored. For example, if a data element is stored at a database called "invoices," the object type may be an invoice, and the data element may be a field within an invoice document.

As such, code instructions written in accordance with the Swagger specification become much easier to parse, because an automatic search for such syntaxes or available actions may be performed to identify subsets of code instructions prescribing specific data locations. Parsing of such open-standard code instructions is made easier because the Swagger API clearly defines the ways in which data may be transferred or altered during a business integration process.

The Swagger specification provides an example API for an online pet store. According to the example pet store API, the pet store API code instructions may be written in a JSON file accessible by entities attempting to access or manipulate data controlled by the pet store API. An example portion of the code instruction for such a Swagger pet store API may include a simple code set including a Swagger path object, a Swagger operation object, and a Swagger parameter object such as:

```
paths:
    /pets/{PetId}:
    get:
        summary: Gets a pet by ID.
        parameters:
        -   in: path
            name: PetId
            type: integer
            required: true
            description: Numeric ID of the pet to get.
```

A path object in the Swagger standard may identify a location (e.g. path to a location) at which a data element may be accessed or manipulated. As described herein, in some embodiments, the "object type" of a data element may be defined by such a location at which it is stored. Thus, the "path object" defined within the Swagger standard may be equivalent in some embodiments to the "object type" described herein. The Swagger specification requires path objects to have a syntax including a line of text "paths:" and a next line of text identifying the path between a leading and following forward slash. For example, the Swagger connector integration element generation system may parse the JSON file code set given above to identify the following "pets" Swagger path object:

```
paths:
    /pets/
```

This path object may then be stored to memory and associated with an identification "pets." This one example of syntax rules that allow for quick, easy, and automated parsing of code instructions conforming to the Swagger specification.

The Swagger connector integration element generation system may parse the rest of the code instructions within the Swagger pet store API JSON file in an example embodiment to identify other instances of the prompt "paths:" followed by text offset on either side by a first and second forward slash. The Swagger connector integration element generation system may list every line of text meeting this description as an available path according to the Swagger pet store API code instructions. For example, the rest of the code instructions may include other paths, including "employees," "brands," "products," and "services." Once these available other paths are identified, and their associated code instructions adhering to the Swagger syntax rules are stored in memory, the Swagger connector integration element generation system may auto-populate the "object type" drop-down menu 402 in the connector import wizard 400 to include all identified paths within the Swagger API code instructions.

The connector import wizard 400 may thus present this list of available paths in a pull-down menu 402, allowing the user to choose which of these paths to employ. For example, the connector import wizard 400 may present the list 402 to allow a user to choose to perform an action on a data element identified as a "pet" object type, an "employee" object type, a "brand" object type, a "product" object type, or a "services" object type. In such a way, the Swagger connector integration element generation system in embodiments of the present disclosure may automatically parse Swagger-compliant API code instructions, and automatically generate a connector import wizard 400 for such Swagger-compliant API, avoiding the dedication of essential resources to a previously time-consuming task of learning the different syntaxes for each API.

Figure 4B:
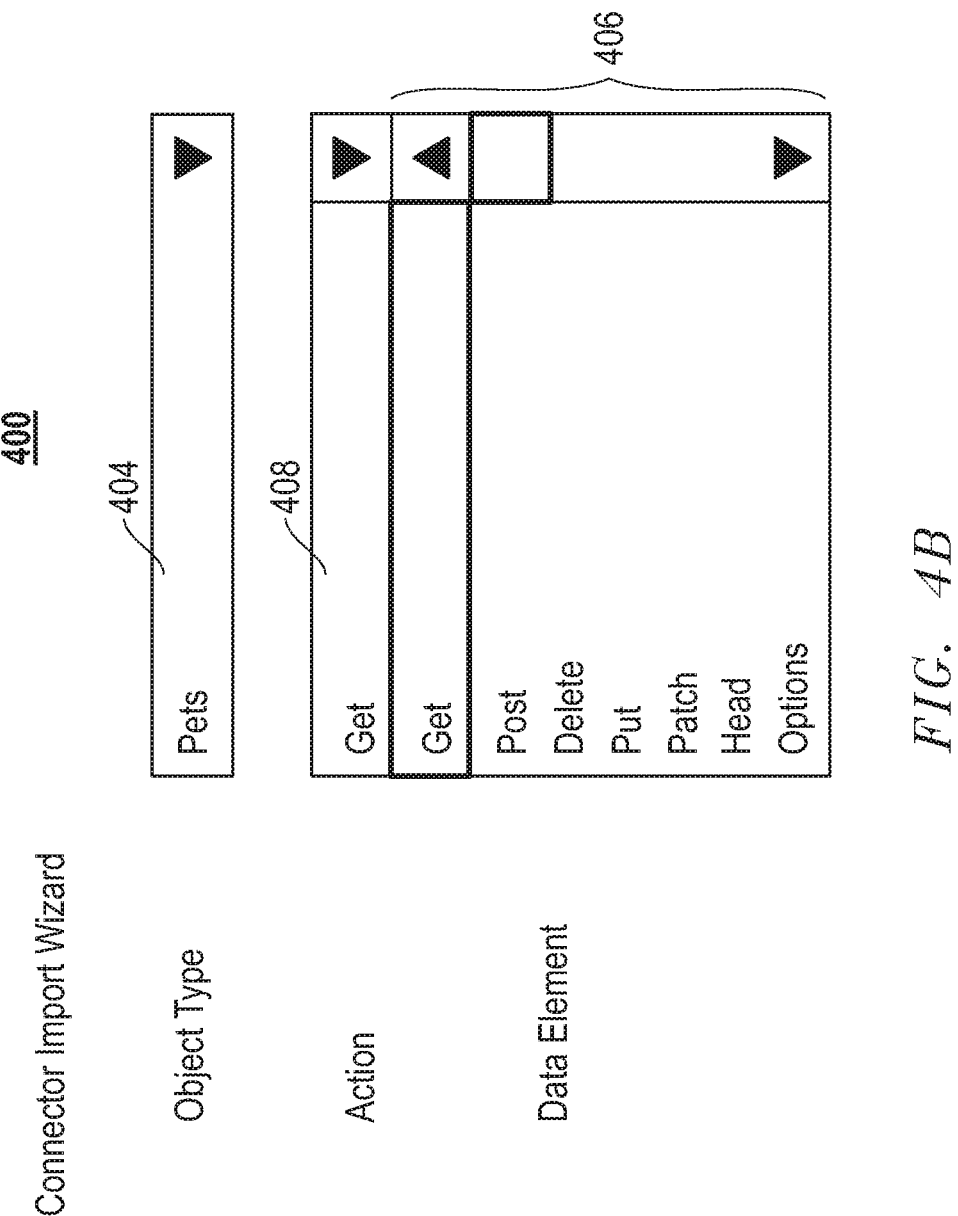
FIG. 4B is a block diagram illustrating a connector import wizard user interface according to another embodiment of the present disclosure.

FIG. 4B is a block diagram illustrating a connector import wizard user interface identifying a user-selected action according to another embodiment of the present disclosure. As described herein, the connector import wizard 400 in an embodiment may allow a user to choose an object type, action, and data element, which may define the way in which data will be integrated, accessed, or manipulated via an API. For example, the connector import wizard 400 may allow a user to choose an action (e.g. "get" 408) from an actions drop-down menu 406. The options presented in the actions drop down menu 406 for available actions in an embodiment may be dictated by the identification of actions employed in the JSON code instructions of the API.

In order to generate such a drop down menu 406, the Swagger connector integration element generation system may access and parse code instructions of the API to identify all mentions of actions. The Swagger standard defines a list of actions that may be performed, referred to as "operation objects." These "operation objects" may be equivalent in some embodiments to "actions" taken on data elements, as shown in the Connector Import Wizard 400.

The Swagger specification lists seven Swagger operation objects programmers may employ in generating Swagger compliant APIs, including "get," "post," "delete," "put," "patch," "head," and "options." Developers of Swagger compliant APIs may include any one of these seven Swagger operation objects in drafting the code sets found in JSON files for Swagger APIs. The Swagger connector integration element generation system in an embodiment may parse a JSON file to identify any instances of any of these predefined Swagger operation objects, and identify each instance as an available action for use in a connector element. For example, the Swagger connector integration element generation system in an embodiment may parse a Swagger JSON file to identify at least one instance of each of the seven Swagger operation objects "get," "post," "delete," "put," "patch," "head," and "options."

In some embodiments, the Swagger connector integration element generation system may allow the user to choose from these seven operation objects without parsing the API code instructions. In such an embodiment, the Swagger connector integration element generation system may store an operation object compliant with the Swagger syntax rules for each of these operations, and associate each operation object with an identification of the operation they perform. For example, the Swagger connector integration element generation system may store the following "get" Swagger operation object in memory and associate it with an identification "get":
get:

Once these available Swagger operation objects are identified (e.g. through parsing the code instructions or by saving all Swagger-compliant operation objects to memory), the Swagger connector integration element generation system in an embodiment may auto-populate the "action" drop-down menu 406 in the connector import wizard 400 to include all identified Swagger operation objects within the Swagger API code instructions, or compliant with the Swagger syntax requirements. The connector import wizard 400 may thus present this list of available actions in a pull-down menu 406, allowing the user to choose which of these actions to employ. For example, the connector import wizard 400 may present the list 406 to allow a user to choose to perform a "get" action 408 on a data element identified as a "pets" object type 404. In such a way, embodiments of the present disclosure may automatically parse Swagger-compliant API code instructions, and automatically generate a connector import wizard 400 for such Swagger-compliant API, avoiding the dedication of essential resources to a previously time-consuming task of learning the different syntaxes for each API.

Figure 4C:
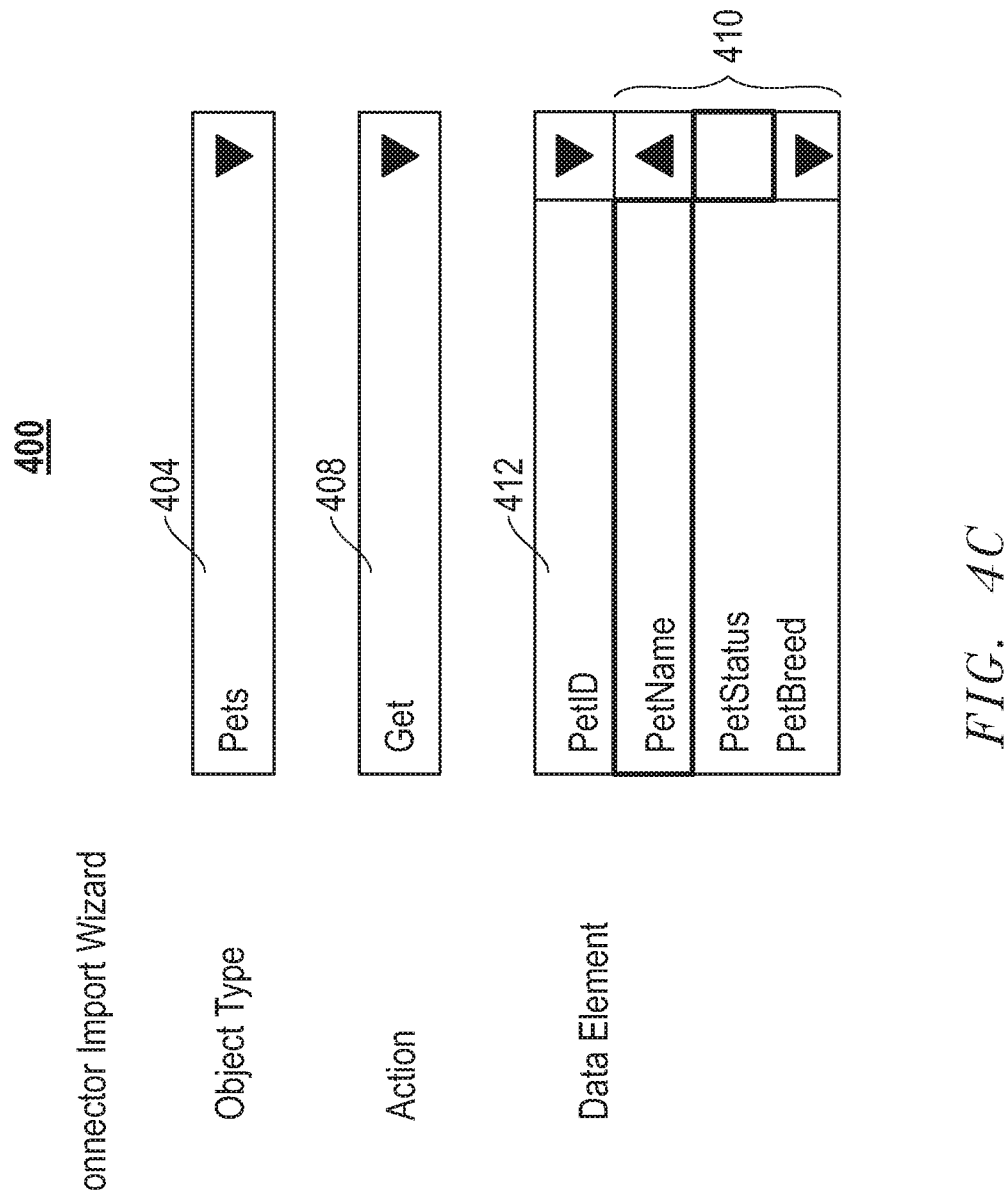
FIG. 4C is a block diagram illustrating a connector import wizard user interface according to yet another embodiment of the present disclosure.

FIG. 4C is a block diagram illustrating a connector import wizard user interface identifying a user-selected data element according to yet another embodiment of the present disclosure. As described herein, the connector import wizard 400 in an embodiment may allow a user to choose an object type, action, and data element, which may define the way in which data will be integrated, accessed, or manipulated via an API. For example, the connector import wizard 400 may allow a user to choose a data element (e.g. "PetID" 412) from a data element drop-down menu 410. The options presented in the data element drop down menu 410 for available data elements in an embodiment may be dictated by the identification of data elements employed in the JSON code instructions of the API.

In order to generate such a drop down menu 410, the Swagger connector integration element generation system in an embodiment may parse the code instructions of the API to identify all mentions of data elements. The Swagger standard defines a specific syntax for identifying data elements. For example, Swagger API code instructions in an embodiment may be parsed to identify subsets of code instructions used to identify "parameter objects" which may be equivalent in some embodiments to data elements, as represented in the Connector Import Wizard 400.

In the example portion of the code instruction for a Swagger pet store API described herein, a simple code set including a Swagger path object, a Swagger operation object, and a Swagger parameter object may be included, such as:

```
paths:
    /pets/{PetId}:
        get:
            summary: Gets a pet by ID.
            parameters:
            -   in: path
                name: PetId
                type: integer
                required: true
                description: Numeric ID of the pet to get.
```

A Swagger parameter object in the Swagger standard may identify a data element that may be accessed and/or manipulated. The Swagger standard may identify a Swagger parameter object in multiple ways. One way in which the Swagger standard may identify a Swagger parameter object is by identifying it by name, following a prompt "parameters:". For example, the Swagger connector integration element generation system may parse the Swagger pet store example code instructions shown above to identify a "PetId" parameter object:

```
            parameters:
                name: PetId
```

The Swagger connector integration element generation system in such an embodiment may store the above parameter object in memory and associate it with an identification "PetID," shown in the connector input wizard user interface 400 at 404.

Another way in which the Swagger standard may identify a Swagger parameter object is by referring back to the Swagger path object most recently invoked. For example, reference back to the Swagger path object most recently invoked may be achieved according to the Swagger standard by generating a line of text "parameters:" followed by a hard return, then a line of text "in: path." In such a way, the Swagger specification dictates the Swagger parameter object may be found in the line of text identifying the Swagger path object most previously invoked. When such syntax is used to define a parameter object, the identification of the parameter object may be found in curly brackets immediately following the most recently invoked path object. For example, the Swagger connector integration element generation system may parse the Swagger pet store example code instructions shown above to identify a "PetId" parameter object:

```
        paths:
            /pets/{PetId}
                parameters:
                    in: path
```

The Swagger connector integration element generation system in such an embodiment may store the above parameter object in memory and associate it with an identification "PetID," shown in the connector input wizard user interface 400 at 404.

The Swagger connector integration element generation system may parse the rest of the code instructions within the Swagger pet store API JSON file in an example embodiment to identify other instances of the prompts "parameters:" and "name:". The Swagger connector integration element generation system may also parse the rest of the code instructions to identify other instances in which the Swagger parameter object is identified with reference back to the Swagger path object most recently invoked, as described in the example embodiment directly above. Every line of text meeting this description may be listed as an available Swagger parameter object according to the Swagger pet store API code instructions. For example, the rest of the code instructions may include other Swagger parameter objects, including "PetName," "PetStatus," and "PetBreed." Once these available other Swagger parameter objects are identified, the Swagger connector integration element generation system may auto-populate the "data element" drop-down menu 410 in the connector import wizard 400 to include all identified Swagger parameter objects within the Swagger API code instructions. The connector import wizard 400 may thus present this list of available Swagger parameter objects in a data element pull-down menu 410, allowing the user to choose which of these Swagger parameter objects to act upon. For example, the connector import wizard 400 may present the list 410 to allow a user to choose to perform the "get" action 408 on a data element identified as a "petID" 412, a "PetName," a "PetStatus," or a "PetBreed" located at the "pets" 404 path. In such a way, embodiments of the present disclosure may automatically parse Swagger-compliant API code instructions, and automatically generate a connector import wizard 400 for such Swagger-compliant API, avoiding the dedication of essential resources to a previously time-consuming task of learning the different syntaxes for each API.

Figure 5:
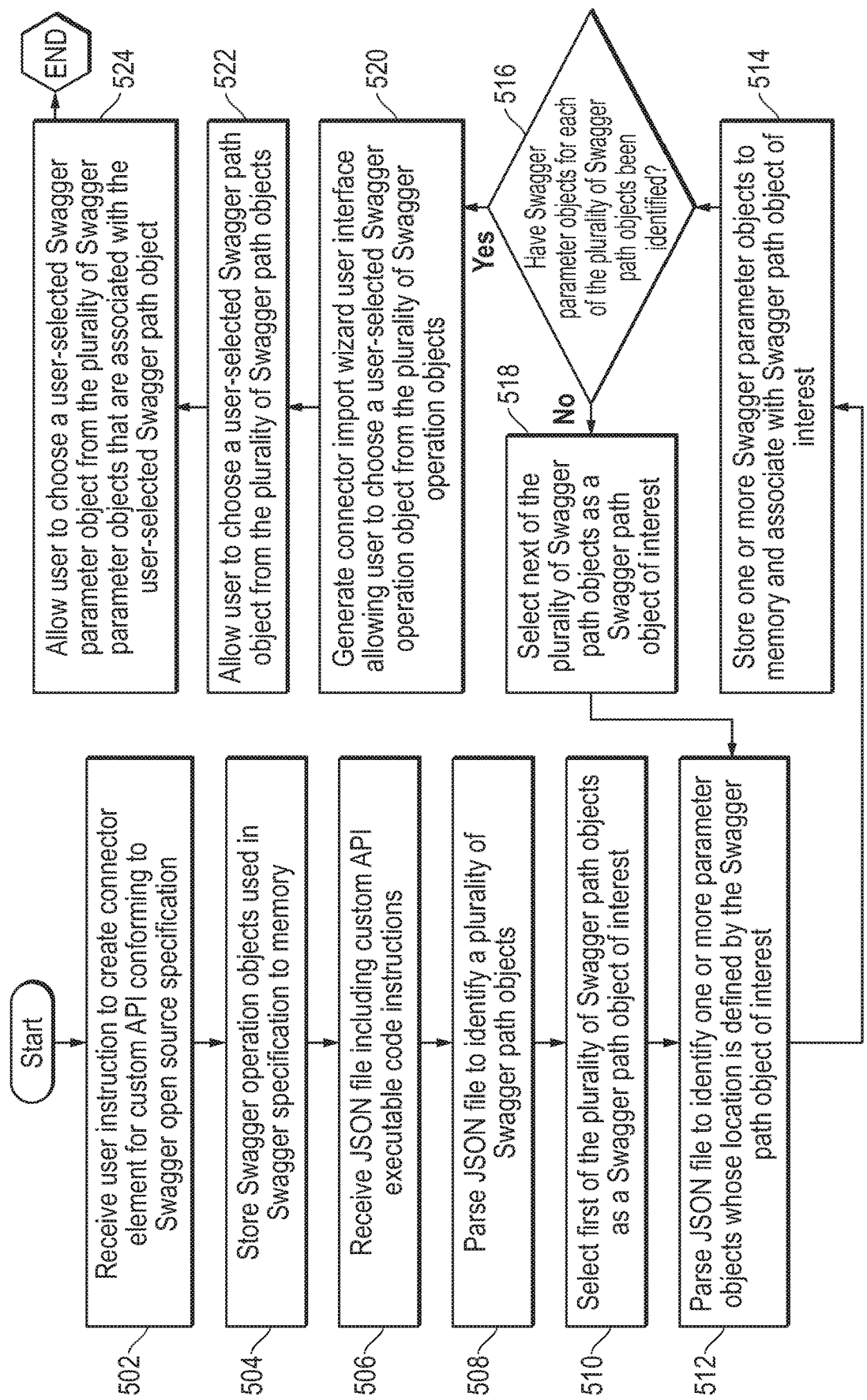
FIG. 5 is a flow diagram illustrating a method of generating a custom connector integration element according to an embodiment of the present disclosure.

FIG. 5 is a flow diagram illustrating a method of generating a custom connector visual element allowing a user to choose an object type, action, and data element via a connector import wizard according to an embodiment of the present disclosure. At block 502, in an embodiment, the integration process-modeling user interface may receive a user instruction to create a connector element for a custom API conforming to the Swagger open source specification. As described herein, a user may generate a flow diagram in an embodiment by providing a chronology of process-representing integration elements via the use of an integration process-modeling user interface. An integration process-modeling user interface in an embodiment may provide a design environment permitting a user to define process flows between applications and systems. Such an integration process-modeling user interface in an embodiment may provide a menu of pre-defined user-selectable elements representing integration sub-processes and permit the user to arrange them as appropriate to model a full integration process. For example, a user may model a process including accessing, and/or manipulating data controllable by an API by adding a connector element to the integration process flow diagram.

At block 504, in an embodiment, the Swagger connector integration element generation system may store a plurality of Swagger operation objects used in the Swagger specification to memory. The Swagger specification lists seven Swagger operation objects programmers may employ in generating Swagger compliant APIs, including "get,"

"post," "delete," "put," "patch," "head," and "options." Developers of Swagger compliant APIs may include any one of these seven Swagger operation objects in drafting the code sets found in JSON files for Swagger APIs. A Swagger operation object in an embodiment may include code instructions identifying the operation, followed by a colon and a hard return. For example, in an embodiment described with reference to FIG. 4B, the following Swagger operation object may be stored in memory at block 504:

get:

A Swagger connector integration element generation system may receive an open-source, human-readable, machine-executable file including the code instructions for the API controlling the data the user wishes to access and/or manipulate in an embodiment at block 506. In order to access and/or manipulate the data controlled by an API in an embodiment, it must be determined the ways in which the API allows for access and manipulation of data under its control. The executable code instructions of the API may dictate the ways in which the integration process may access and or manipulate data controlled by the API. For example, an API may provide specifications for the ways in which routines, data structures, object classes, variables, or remote calls may be invoked and/or handled during business integration processes. Such code instructions may be generated in an open-source, human-readable, machine-executable formatted file. In an example embodiment, the API code instructions received at block 506 may take the form of a JSON file. In other embodiments, the API code instructions received at block 506 may take the form of an XML file, or other current or future-developed type of open-source, human-readable, machine-executable file format.

Many API developers use test bed applications or testing platforms for debugging of API code instructions. For example, the Postman application provides a platform in which developers can design and mock, debug, test, generate documentation for, monitor, and publish API code instructions, including those adhering to the Swagger specification. Use of such a testing platform application produces JSON files, shareable with the Swagger connector integration element generation system in an embodiment. A user may provide such a JSON file directly to the Swagger connector integration element generation system in an embodiment, or may set up a sharing session between the Swagger connector integration element generation system and the testing platform application (e.g. Postman) the developer is using.

At block 508, in an embodiment, the Swagger connector integration element generation system may parse the open-source, human-readable, machine-executable file to identify a plurality of Swagger path objects. The Swagger standard defines a specific syntax for identifying data locations, a list of available actions that can be taken on data, and a syntax for identifying specific data sets or data elements. As such, code instructions written in accordance with the Swagger specification become much easier to parse, because an automatic search for such syntaxes or available actions may be performed to identify subsets of code instructions prescribing specific data locations. For example, in an embodiment in which the Swagger API code instructions are for a Swagger pet store, the Swagger connector integration element generation system may parse the following code instructions:

```
paths:
    /pets/{PetId}:
    get:
        summary: Gets a pet by ID.
        parameters:
        -   in: path
            name: PetId
            type: integer
            required: true
            description: Numeric ID of the pet to get.
```

A "path object" defined within the Swagger standard may be equivalent in some embodiments to the "object type" described herein. The Swagger specification dictates that paths be defined immediately following the prompt "paths:" and be offset on either side by a first and second forward slash. This one example of syntax rules that allow for quick, easy, and automated parsing of code instructions conforming to the Swagger specification. In such an example embodiment, the Swagger connector integration element generation system may parse the JSON file code set to identify the Swagger path object as: "pets," because it is the text immediately following the prompt "paths:" and is offset on either side by a first and second forward slash. The Swagger path object code instructions associated with this identification in such an embodiment may include the identification "pets" written in the syntax required for Swagger path objects, and may be:

```
paths:
    /pets/
```

In other embodiments, the path object may be defined by other syntax rules. In such embodiments, the Swagger connector integration element generation system may parse the JSON file code set to identify each instance of such other syntax to identify a plurality of path objects.

In some embodiments, the Swagger connector integration element generation system may parse the rest of the code instructions within the Swagger JSON file in an example embodiment to identify other instances of the prompt "paths:" followed by text offset on either side by a first and second forward slash. Each line of text meeting this description may be an available path according to the Swagger API code instructions. For example, in an embodiment described with reference to FIG. 4A, the rest of the Swagger pet store API code instructions may include other paths, including "employees," "brands," "products," and "services."

Once each of the plurality of path objects have been identified at block 508, they may each be stored to memory, and associated with their respective identifications. For example, in an embodiment, the following Swagger path object code instructions may be stored to memory and associated with an identification of "pets:"

```
path:
    /pets/
```

The Swagger connector integration element generation system in an embodiment may select a first of the plurality of Swagger path objects as a Swagger path object of interest at block 510. Each Swagger path object in an embodiment may define a path at which one or more Swagger parameter objects may be located. In order to properly map the location of each of these Swagger parameter objects, the Swagger connector integration element generation system in an embodiment may identify the Swagger path object associated with each Swagger parameter object in the Swagger JSON file. In order to do so, the Swagger connector integration element generation system in an embodiment may analyze code instructions associated with each identified Swagger path object in turn. For example, in an embodiment, the Swagger connector integration element generation system may select the Swagger path object identified as "pets" as the Swagger path object of interest.

At block 512, in an embodiment, the Swagger connector integration element generation system may parse the JSON file to identify one or more parameter objects whose location is defined by the Swagger path object of interest. For example, if the Swagger connector integration element generation system in an embodiment selects the Swagger path object identified as "pets" as the Swagger path object of interest, the Swagger connector integration element generation system may then parse the JSON file to identify one or more parameter objects whose location is defined by the "pets" Swagger path object.

A Swagger parameter object in the Swagger standard may identify a data element that may be accessed and/or manipulated. The Swagger specification may include one or more syntaxes used to identify Swagger parameter objects in an embodiment. In one embodiment, a Swagger parameter object may be identified by employing the text "parameters: ", followed by a hard return, then the text "name:", followed by the identification of the Swagger parameter object. For example, in an embodiment described with reference to FIG. 4C, the Swagger connector integration element generation system may parse the example Swagger pet store code instructions below to identify a Swagger parameter object "PetId" whose location is defined by the Swagger path object "pets":

```
paths:
    /pets/{PetId}:
        get:
            summary: Gets a pet by ID.
            parameters:
                - in: path
                  name: PetId
                  type: integer
                  required: true
                  description: Numeric ID of the pet to get.
```

Another syntax used in the Swagger standard to identify a Swagger parameter object is by referring back to the Swagger path object most previously invoked. For example, reference back to the Swagger path object most previously invoked may be achieved according to the Swagger standard by generating a line of text "parameters:" followed by a hard return, then a line of text "in: path." In such a way, the Swagger specification dictates the Swagger parameter object may be found in the line of text identifying the Swagger path object most previously invoked. Referring back to the line of text identifying the Swagger path object in such an embodiment, the Swagger parameter object may be found following the second forward slash of the Swagger path object, and may be enclosed by "curly brackets."

For example, parsing the Swagger pet store code instructions shown above may indicate the code instructions are identifying the Swagger parameter object with reference back to the Swagger path object. This can be easily identifying through parsing, because the Swagger code instructions include the subset of code instructions:

```
parameters:
    - in: path
```

While parsing, the Swagger connector integration element generation system may then refer back to the Swagger path object most recently invoked in order to locate the text immediately following the second forward slash following the Swagger path object "pets":

```
paths:
    /pets/{PetId}:
```

In such a way, the Swagger connector integration element generation system may identify a Swagger parameter object {PetId} whose location is defined by the Swagger path object "pets."

The Swagger connector integration element generation system may parse the rest of the code instructions within the Swagger pet store API JSON file in an example embodiment to identify other instances of the prompts "parameters:" and "name:" nested below the Swagger path object of interest. The Swagger connector integration element generation system may also parse the rest of the code instructions to identify other instances in which the Swagger parameter object is identified with reference back to the Swagger path object of interest, as described in the example embodiment directly above. For example, the Swagger connector integration element generation system in an embodiment may parse the rest of the code instructions to identify Swagger parameter objects identified as "PetName," "PetStatus," and "PetBreed," whose locations are also defined by the Swagger path object "pets." In such a way, the Swagger connector integration element generation system may identify all Swagger parameter objects whose locations are defined by the Swagger path object of interest in an embodiment.

At block 514, the Swagger connector integration element generation system may store one or more Swagger parameter objects to memory and associate each Swagger parameter object with the Swagger path object defining its location. The Swagger parameter object code instructions associated with this identification in such an embodiment may include the identification "PetId" written in one of the plurality of syntaxes required for Swagger parameter objects. For example, in an embodiment in which the Swagger parameter object "PetId" is identified at block 512 because the Swagger code instructions employed the text "parameters:", followed by a hard return, then the text "name:", followed by the identification of the Swagger parameter object, the Swagger parameter object stored to memory may be:

```
parameters:
    name: PetId
```

As another example, in an embodiment in which the Swagger parameter object "PetId" has been identified at block 512 with reference back to the Swagger path object, the Swagger parameter object may be:

```
paths:
    /pets/{PetId}:
        parameters:
            - in: path
```

Once the Swagger parameter object defined by the Swagger path object of interest has been stored to memory at block 514, the Swagger connector integration element generation system in an embodiment may associate the Swagger parameter object with the Swagger path object of interest (e.g. Swagger path object defining its location), which has also been stored to memory at block 508. Further, the Swagger connector integration element generation system in an embodiment may associate the identification "PetID" for the Swagger parameter object with the Swagger parameter object code instructions stored in memory. Still further, in some embodiments, the Swagger connector integration element generation system may associate the identification "PetID" for the Swagger parameter object with the identification "pets" of the Swagger path object defining the location of the Swagger parameter object identified as "PetID."

At block 516, in an embodiment, the Swagger connector integration element generation system may determine whether Swagger parameter objects for each of the plurality of Swagger path objects have been identified. As described herein, the Swagger connector integration element generation system in an embodiment may analyze code instructions associated with each identified Swagger path object in turn in order to properly map the location of each of these Swagger parameter objects. If Swagger parameter objects for each of the plurality of Swagger path objects has not been identified in an embodiment, the method may proceed to block 518. If Swagger parameter objects for each of the plurality of Swagger path objects have been identified in an embodiment, the method may proceed to block 520.

At block 518, in an embodiment in which Swagger parameter objects for each of the plurality of Swagger path objects has not been identified, the Swagger connector integration element generation system may select a next of the plurality of Swagger path objects identified as block 508 as the Swagger path object of interest. The method may then proceed back to block 512, where the Swagger code instructions may be parsed to identify and store all Swagger parameter objects whose locations are defined by the current Swagger path object of interest. Iterating through the entire list of Swagger path objects identified at block 508, the Swagger connector integration element generation system may identify all Swagger parameter objects in the Swagger API code instructions.

In addition to identifying all Swagger parameter objects, the Swagger connector integration element generation system in an embodiment may also operate to map the location of each Swagger parameter object, as defined by an associated Swagger path object. By parsing the Swagger API code instructions at block 512 to identify Swagger parameter objects associated with each of the plurality of Swagger path objects identified at block 508, the Swagger connector integration element generations system may effectively identify and map each available swagger parameter object available for accessing and/or manipulation according to the Swagger API code instructions.

At block 520, in an embodiment, the Swagger connector integration element generation system may generate a connector import wizard user interface allowing a user to choose a user-selected Swagger operation object from the plurality of Swagger operation objects. The plurality of Swagger operation objects in an embodiment may be the Swagger operation objects stored to memory at block 504. For example, in an embodiment described with reference to FIG. 4B, the connector import wizard user interface 400 may allow a user to choose a user-selected Swagger operation object identified as "get" 408 from the plurality of Swagger operation objects shown in the pull-down menu 406. The identification "get" 408 in an embodiment may be associated in memory with the Swagger operation object:
   get:

The Swagger connector integration element generation system may generate the connector import wizard user-interface in an embodiment by auto-populating the "action" drop-down menu 406 in the connector import wizard 400 to include all identified Swagger operation objects. The connector import wizard 400 may thus present this list of available Swagger operation objects in an object type pull-down menu 408, allowing the user to choose a Swagger operation object.

The Swagger connector integration element generation system in an embodiment may allow the user to choose a user-selected Swagger path object from the plurality of Swagger path objects via the connector import wizard user interface at block 522. The plurality of Swagger path objects in an embodiment may be the plurality of path objects identified and stored to memory at block 508. For example, in an embodiment described with reference to FIG. 4A, the connector import wizard user interface 400 may allow a user to choose a user-selected Swagger path object identified as "pets" 404 from the plurality of Swagger path objects shown in the pull-down menu 402. The identification "pets" 408 in an embodiment may be associated in memory with the Swagger path object:

---
paths:
/pets/

---

The Swagger connector integration element generation system may generate the connector import wizard user-interface in an embodiment by auto-populating the "object type" drop-down menu 402 in the connector import wizard 400 to include all identified Swagger path objects within the Swagger API code instructions. The connector import wizard 400 may thus present this list of available Swagger path objects in an object type pull-down menu 402, allowing the user to choose a Swagger path object.

At block 524, the Swagger connector integration element generation system in an embodiment may allow the user to choose a user-selected Swagger parameter object from the plurality of Swagger parameter objects that are associated with the user-selected Swagger path object via the connector import wizard user interface. The plurality of Swagger parameter objects associated with the user-selected Swagger path object in an embodiment may be the plurality of parameter objects identified and stored to memory at blocks 512 and 514 while the user-selected Swagger path object was defined as the Swagger path object of interest at block 510. For example, in an embodiment described with reference to FIG. 4C, the connector import wizard user interface 400 may allow a user to choose a user-selected Swagger path object identified as "PetID" 412 from the plurality of Swagger path objects shown in the pull-down menu 410. The identification "PetID" 412 in one embodiment may be associated in memory with the Swagger parameter object:

---
parameters:
name: PetId

---

In another embodiment, the identification "PetID" may be associated in memory with the Swagger parameter object:

```
paths:
    /pets/{PetId}:
        parameters:
            - in: path
```

The Swagger connector integration element generation system may generate the connector import wizard user-interface in an embodiment by auto-populating the "data element" drop-down menu 410 in the connector import wizard 400 to include all identified Swagger parameter objects associated with the user-specified Swagger path object "pets" within the Swagger API code instructions. The connector import wizard 400 may thus present this list of available Swagger parameter objects in a data element pull-down menu 412, allowing the user to choose a Swagger parameter object. In such a way, embodiments of the present disclosure may automatically parse Swagger-compliant API code instructions, and automatically generate a connector import wizard 400 for such Swagger-compliant API, avoiding the dedication of essential resources to a previously time-consuming task of learning the different syntaxes for each API.

Figure 6:
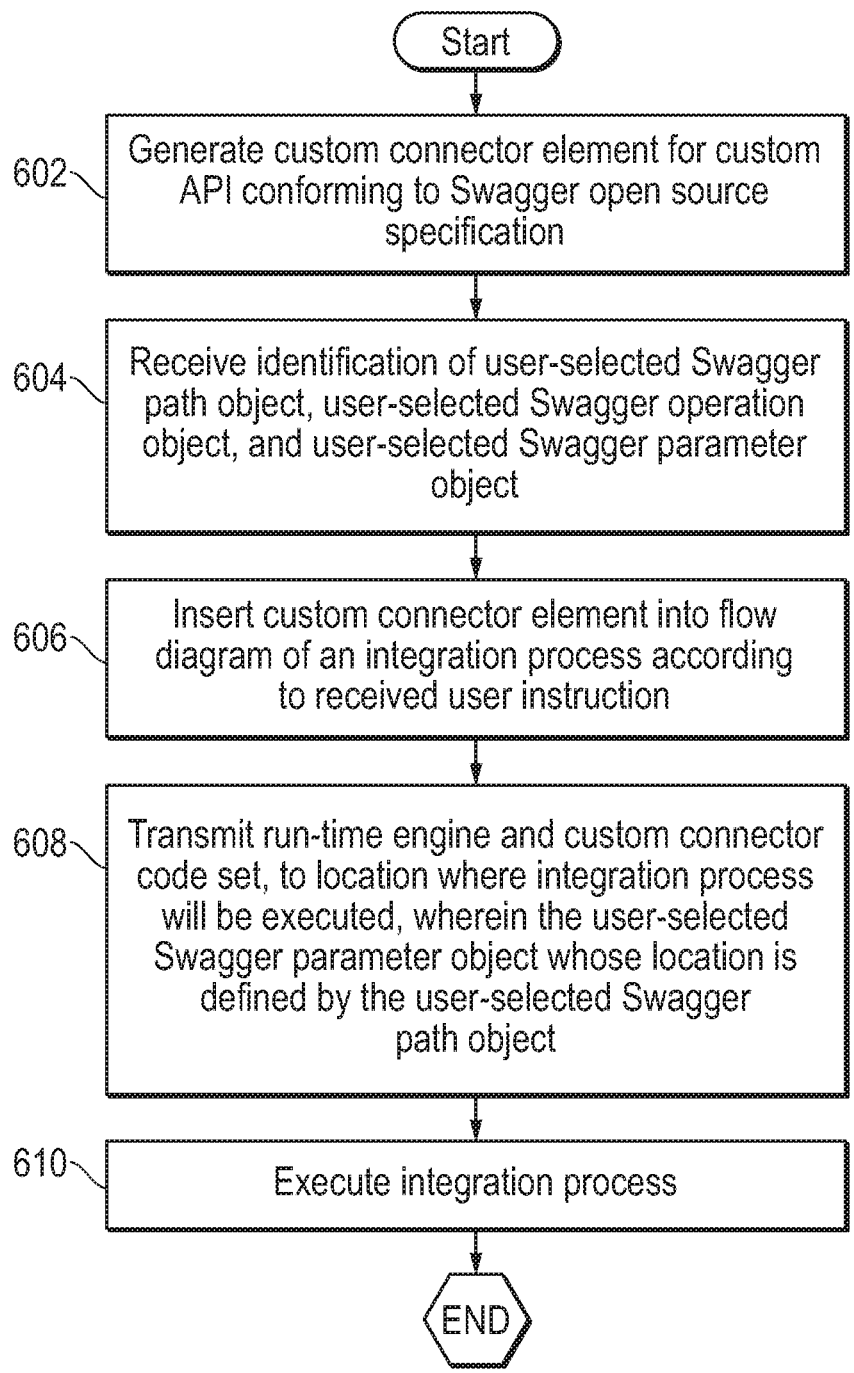
FIG. 6 is a flow diagram illustrating a method of transmitting a custom connector code set to an execution location according to an embodiment of the present disclosure.

FIG. 6 is a flow diagram illustrating a method of transmitting a custom connector code set and a run-time engine capable of executing that code set to an execution location according to an embodiment of the present disclosure. At block 602, in an embodiment, the Swagger connector integration element generation system in an embodiment may receive identification of a user-selected Swagger path object, user-selected Swagger operation object, and user-selected Swagger parameter object via a connector import wizard user interface. Such user input may indicate an action a user wishes to take on a data element having a specific object type in an embodiment. For example, in an embodiment described with reference to FIGS. 4A-4C, the Swagger connector integration element generation system in an embodiment may receive identification of a user-selected Swagger path object "pets" 404, a user-selected Swagger operation object "get" 408, and a user-selected Swagger parameter object "PetID" 412.

At block 604, in an embodiment, the Swagger connector integration element generation system in an embodiment may generate a custom connector element for a custom API conforming to the Swagger open source specification. As described herein, a user may generate a flow diagram in an embodiment by providing a chronology of process-representing integration elements via the use of an integration process-modeling user interface. Such an integration process-modeling user interface in an embodiment may provide a design environment permitting a user to define process flows between an enterprise system and a Swagger-compliant API according to a customized business integration process. At block 604, the Swagger connector integration element generation system in an embodiment may add a custom connector element representing a process flow step defined by the user-selected Swagger path object, user-selected Swagger operation object, and user-selected Swagger parameter object into a menu of an integration process-modeling user interface of available pre-defined, user-selectable elements representing integration sub-processes.

At block 606, in an embodiment, a custom connector element generated at block 604 into a flow diagram of an integration process according to user instruction received via an integration process-modeling user interface. Once the Swagger connector integration element generation system places the custom connector element into the menu of available pre-defined, user-selectable elements within the integration process-modeling user interface in an embodiment, users of the integration process-modeling user interface may be capable of adding the custom connector element to a new or existing integration process flow diagram. Open-source, human-readable, machine-executable code instructions (e.g. JSON code instructions) represented by the custom connector element inserted into the flow diagram may be stored in memory in the form of Swagger path objects, Swagger operation objects, and Swagger parameter objects.

In some embodiments, adding the custom connector element to an integration process flow diagram may prompt the connector import wizard user interface to engage. In such embodiments, upon insertion of the custom connector element into the integration process flow diagram, the connector import wizard user interface may automatically prompt the user to choose whether to keep or change the user-specified Swagger path object, the user-specified Swagger operation object, and the user-specified Swagger parameter object whose identifications were received at block 602. In other embodiments, insertion of the custom connector element into the integration process flow diagram may result in the connector import wizard user interface prompting the user for identification of a new user-specified Swagger path object, a new user-specified Swagger operation object, and a new user-specified Swagger parameter object. Once this data has been provided, the connector visual element may be inserted into a flow process with other visual elements representing other functions of the whole integration process.

For example, in an embodiment described with reference to FIG. 3, a user may generate a flow diagram in an embodiment by providing a chronology of process-representing visual elements (e.g. 302-316*b*) via the use of an integration process-modeling user interface. The integration process-modeling user interface in an embodiment may provide a menu of pre-defined user-selectable visual elements and permit the user to arrange them as appropriate to model a process. The elements may include visual, drag-and-drop icons representing specific units of work (known as process components) required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the customized data integration software application creation system in the form of connector code sets, trading partner code sets, and/or data profile code sets.

At block 608, the Swagger connector integration element generation system in an embodiment may transmit a run-time engine, and a custom connector code set to a location where the integration process will be executed. The custom connector code set in an embodiment may be code instructions in which a user-selected Swagger operation object acts on the user-selected Swagger parameter object whose location is defined by the user-selected Swagger path object. For example, in an embodiment described with reference to FIGS. 4A-4C, a user-specified Swagger path object "pets" 404 may be associated with a Swagger path object:

```
path:
    /pets/
```

A user-specified Swagger operation object "get" 408 in an embodiment may be associated with a Swagger operation object:
    get:
A user-specified Swagger parameter object "PetID" 412 in one embodiment may be associated with a Swagger operation object:

```
parameter:
    name: PetId
```

In such an embodiment, at block 608, the integration process-modeling user interface may transmit a run-time engine and a connector code set including the following Swagger-compliant code instructions to a location for execution by the run-time engine:

```
paths:
    /pets/:
        get:
            parameters:
                name: PetId
```

In another embodiment, a user-specified Swagger parameter object "PetID" 412 may be associated with a Swagger operation object:

```
paths:
    /pets/{PetId}:
        parameters:
            - in: path
```

In such an embodiment, at block 608, the integration process-modeling user interface may transmit a run-time engine and a connector code set including the following Swagger-compliant code instructions to a location for execution by the run-time engine:

```
paths:
    /pets/{PetId}:
        get:
            parameters:
                - in: path
```

As described in an embodiment with reference to FIG. 2, a provider of a service ("service provider") for creating on-demand, real-time creation of customized data integration software applications may operate a service provider server/system 212 may be specially configured to store certain pre-defined, i.e. pre-built, datasets in its memory, including the custom connector code set described directly above. Such data may also include a pre-defined container (also referred to herein as a "dynamic runtime engine") installation program that is executable at the enterprise system 214, at a third party server (not shown) located remotely from both the service provider system/server 212 and the enterprise system 214, within the enterprise cloud 216, and/or within the service provider cloud 218.

The runtime engine may operate to download or receive machine-readable, executable code instructions from the service provider server/system 212 in the form of code sets, which may include a custom connector code set. The runtime engine may further operate to execute code sets in order to perform an integration process or a portion of an integration process, providing for exchange of business integration data between the enterprise's business process system 204 and user device 202 within the enterprise network 214, and/or between the enterprise network 214 and trading partners 208 and 210, and/or between the enterprise's internal computing system 204 and the enterprise's computing systems external to the enterprise network 214.

The dynamic runtime engine may download to its location or receive at its location the custom connector code set from the service provider system/server 212, and execute code sets according to the integration process flow diagram residing at the service provider server/system 212 and modeled by the user using the integration process-modeling user interface.

At block 610, in an embodiment, the integration process may be executed. The integration process in an embodiment may be executed at the location of the runtime engine, which may be located in one of several different places. For example, in an embodiment described with reference to FIG. 2, the runtime engine may execute the integration process, thus invoking the custom connector code set and the custom data profile code set, at the service provider system/server 212, the enterprise system/network 214, the service provider cloud location 218, and/or the enterprise cloud location 216. By executing the integration process, the code instructions parsed from the JSON file for the API adhering to the Swagger specification may be recombined according to the user's preference in order to access, and/or manipulate data of the Swagger compliant API without having to generate a plug-in between the Swagger compliant API and other data sources not compliant with Swagger. The process may then end.

The blocks of the flow diagrams 5-6 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a swagger connector integration element generation system comprising:
a processor executing code instructions of a customized data integration software application creation system for visually modelling and generating code for a visually modelled business integration process to conduct bi-directional exchange of data between internal applications of an enterprise, between internal enterprise applications and external trading partners, or between internal enterprise applications and applications running external to the enterprise;
the processor receiving instructions from a user via a graphical user interface for inserting a custom Swagger connector visual element into the visually modelled business integration process;
the processor receiving an open-standard format file for human-readable, machine-executable code instructions of a Swagger custom application platform interface (API) adhering to a Swagger API open source specification;
the processor parsing the open-standard format file to identify a plurality of Swagger parameter objects and a plurality of Swagger path objects, based on syntax schemes defined by the Swagger API open source specification;
the processor receiving a user-selected first Swagger path object from the plurality of Swagger path objects, a user-selected first Swagger parameter object from the plurality of Swagger path objects, and a user-selected first Swagger operation object from a stored plurality of Swagger operation objects;
the processor generating a custom connector code set associated with the custom Swagger connector visual element, the custom connector code set instructing the Swagger custom API to perform an action defined by the user-selected first Swagger operation object on the user-selected first Swagger parameter object within the visually modelled business integration process;
wherein performing the action includes adding the custom connector code into the integration process flow diagram and prompting the user to keep or change the user selected first Swagger operation object or the user-selected first Swagger parameter object; and
the processor transmitting an executable run-time engine and the custom connector code set for execution of the visually modelled business integration process at an execution location.

2. The information handling system of claim 1, wherein a location of each of the plurality of Swagger parameter objects is defined by one of the plurality of Swagger path objects further comprising: the processor generating a connector import wizard user-interface allowing a user to choose the user-selected first Swagger path object from the plurality of Swagger path objects.

3. The information handling system of claim 2, wherein the connector import wizard user-interface allows a user to choose the user-selected first Swagger parameter object from the plurality of Swagger parameter objects.

4. The information handling system of claim 1 further comprising: the processor generating a connector import wizard user-interface allowing a user to choose the user-selected first Swagger operation object from the stored plurality of Swagger operation objects.

5. The information handling system of claim 1, wherein the open-standard format file adheres to the Extended Markup Language (XML) open-standard format.

6. The information handling system of claim 1, wherein the syntax scheme defines a format for identifying each of the plurality of Swagger path objects.

7. The information handling system of claim 1, wherein the user-selected first Swagger parameter object is a Swagger path-parameter object.

8. A method of executing a customized software integration application comprising:
executing code instructions of a customized data integration software application creation system, via a processor, for visually modelling and generating code for a visually modelled business integration process to conduct bi-directional exchange of data between internal applications of an enterprise, between internal enterprise applications and external trading partners, or between internal enterprise applications and applications running external to the enterprise;
receiving instructions from a user, via a graphical user interface, for inserting a custom Swagger connector visual element into the visually modelled business integration process;
receiving via a processor an open-standard format file for human-readable, machine-executable code instructions of a Swagger custom application platform interface (API) adhering to a Swagger API open source specification to be associated with the custom Swagger connector visual element;
parsing via a processor the open-standard format file to identify a plurality of Swagger parameter objects and a plurality of Swagger path objects, based on syntax schemes defined by the Swagger API open source specification;
generating a connector import wizard user-interlace for customizing the custom Swagger connector visual element allowing the user to select a user-selected first Swagger parameter object from the plurality of Swagger parameter objects, and for the user to select a user-selected first Swagger operation object from a stored plurality of Swagger operation objects;
generating, a custom connector code set associated with the custom Swagger connector visual element, the custom connector code set instructing the Swagger custom API to perform an action defined by the user-selected first Swagger operation object on the user-selected first Swagger parameter object within the visually modelled business integration process;
wherein performing the action includes adding the custom connector code into the integration process flow diagram and prompting the user to keep or change the user-selected first Swagger operation object or the user-selected first Swagger parameter object; and
transmitting an executable run-time engine, and the custom connector code set for execution of the visually modelled business integration process at an execution location.

9. The method of claim 8, wherein a location of each of the plurality of Swagger parameter objects is defined by one of the plurality of Swagger path objects, and the connector import wizard user-interface allows the user to choose a user-selected Swagger path object from the plurality of Swagger path objects, further comprising: transmitting the user-selected Swagger path object for execution.

10. The method of claim 8, wherein the open-standard format file adheres to the JavaScript Object Notation (JSON) open-standard format.

11. The method of claim 8, wherein the user-selected Swagger parameter object is a Swagger header parameter object.

12. The method of claim 8, wherein the user-selected Swagger parameter object is a Swagger body parameter object.

13. The method of claim 8, wherein the user-selected Swagger parameter object is a Swagger form parameter object.

14. The method of claim 8, wherein the user-selected Swagger parameter object is a Swagger path-parameter object.

15. An information handling system operating a Swagger connector integration element generation system comprising:
- a processor executing code instructions of a customized data integration software application creation system for visually modelling and generating code for a visually modelled business integration process to conduct bi-directional exchange of data between internal applications of an enterprise, between internal enterprise applications and external trading partners, or between internal enterprise applications and applications running external to the enterprise;
- the processor receiving instructions from a user via a graphical user interface for inserting a custom Swagger connector visual element into the visually modelled business integration process;
- the processor receiving a JavaScript object notification format (JSON) file including executable code instructions of a Swagger custom application platform interface (API) adhering to a Swagger API open source specification to be associated with the custom Swagger connector visual element;
- the processor parsing the JSON file to identify a plurality of Swagger parameter objects and a plurality of Swagger path objects, based on syntax schemes defined by the Swagger API open source specification;
- the processor generating a connector import wizard user-interface for customizing the custom Swagger connector visual element allowing the user to select a user-selected first Swagger parameter object from the plurality of Swagger parameter objects, and for the user to select a user-selected first Swagger operation object from a stored plurality of Swagger operation objects;
- the processor generating a custom connector code set associated with the custom Swagger connector visual element, the custom connector code set instructing the Swagger custom API to perform an action defined by the user-selected first Swagger operation object on the user-selected first Swagger parameter object within the visually modelled business integration process;
- wherein performing the action includes adding the custom connector code into the integration process flow diagram and prompting the user to keep or change the user-selected first Swagger operation object or the user-selected first Swagger parameter object; and
- the processor transmitting an executable run-time engine, and the custom connector code set for execution of the visually modelled business integration process at an execution location.

16. The information handling system of claim 15, wherein the user-selected Swagger operation object is a Swagger patch operation object.

17. The information handling system of claim 15, wherein the user-selected Swagger operation object is a Swagger head operation object.

18. The information handling system of claim 15, wherein the user-selected Swagger operation object is a Swagger options operation object.

19. The information handling system of claim 15, wherein the user-selected Swagger operation object is a Swagger post operation object.

20. The information handling system of claim 15, wherein the user-selected Swagger operation object is a Swagger post operation object.

* * * * *